US009762838B2

(12) United States Patent
Inoue et al.

(10) Patent No.: US 9,762,838 B2
(45) Date of Patent: Sep. 12, 2017

(54) IMAGING DEVICE AND SIGNAL PROCESSING METHOD TO CORRECT SHADING OF IMAGES HAVING A PHASE DIFFERENCE

(71) Applicant: FUJIFILM Corporation, Tokyo (JP)

(72) Inventors: Kazuki Inoue, Saitama (JP); Yoichi Iwasaki, Saitama (JP); Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/644,899

(22) Filed: Mar. 11, 2015

(65) Prior Publication Data
US 2015/0195473 A1 Jul. 9, 2015

Related U.S. Application Data

(63) Continuation of application No. PCT/JP2013/062948, filed on May 8, 2013.

(30) Foreign Application Priority Data

Sep. 12, 2012 (JP) .................................. 2012-200475
Apr. 30, 2013 (JP) .................................. 2013-095388

(51) Int. Cl.
*H04N 5/232* (2006.01)
*G02B 7/38* (2006.01)
(Continued)

(52) U.S. Cl.
CPC ............ *H04N 5/3765* (2013.01); *G02B 7/38* (2013.01); *H04N 5/23212* (2013.01); *H04N 5/3572* (2013.01); *H04N 5/3696* (2013.01)

(58) Field of Classification Search
CPC ..... G02B 7/38; H04N 5/23212; H04N 5/3572; H04N 5/3696
(Continued)

(56) References Cited

U.S. PATENT DOCUMENTS

2005/0140815 A1* 6/2005 Nakano .................. G02B 7/102
348/345
2006/0056515 A1* 3/2006 Kato .................... H04N 19/139
375/240.16
(Continued)

FOREIGN PATENT DOCUMENTS

JP 2009-159093 A 7/2009
JP 2010-26178 A 2/2010
(Continued)

OTHER PUBLICATIONS

International Search Report, issued in PCT/JP2013/062948, dated Aug. 20, 2013.

*Primary Examiner* — Lin Ye
*Assistant Examiner* — Chan Nguyen
(74) *Attorney, Agent, or Firm* — Birch, Stewart, Kolasch & Birch, LLP

(57) ABSTRACT

An imaging device to which an imaging optical system is attachable, includes a correction data generating unit that generates correction data to correct a sensitivity difference of first phase difference detecting pixel cells and second phase difference detecting pixel cells; and a signal correcting unit that corrects at least one of an output signal of the first phase difference detecting pixel cells and an output signal of the second phase difference detecting pixel cells in accordance with the correction data, in which the correction data generating unit calculates two ratios to generate the correction data based on the two ratios.

13 Claims, 11 Drawing Sheets

(51) Int. Cl.
*H04N 5/357* (2011.01)
*H04N 5/376* (2011.01)
*H04N 5/369* (2011.01)

(58) Field of Classification Search
USPC .................................... 348/294, 345, 349
See application file for complete search history.

(56) References Cited

U.S. PATENT DOCUMENTS

| | | | | |
|---|---|---|---|---|
| 2006/0262225 | A1* | 11/2006 | Chang | H04N 9/66 348/639 |
| 2009/0123078 | A1* | 5/2009 | Ohkawa | G06T 5/002 382/232 |
| 2011/0109775 | A1* | 5/2011 | Amano | H04N 5/23212 348/241 |
| 2012/0057043 | A1 | 3/2012 | Yamamoto | |
| 2012/0147227 | A1 | 6/2012 | Yoshimura et al. | |
| 2013/0068955 | A1* | 3/2013 | Matsuura | G01T 1/24 250/370.09 |
| 2013/0113956 | A1* | 5/2013 | Anderson | G06F 3/017 348/223.1 |

FOREIGN PATENT DOCUMENTS

| | | | | |
|---|---|---|---|---|
| JP | 2010-286826 A | 12/2010 | | |
| JP | 2011-114553 | * 6/2011 | ............. | H04N 5/232 |
| JP | 2011-114553 A | 6/2011 | | |
| JP | 2012-141585 A | 7/2012 | | |

* cited by examiner

IMAGING DEVICE AND SIGNAL PROCESSING METHOD TO CORRECT SHADING OF IMAGES HAVING A PHASE DIFFERENCE

CROSS REFERENCE TO RELATED APPLICATION

This is a continuation of International Application No. PCT/JP2013/062948 filed on May 8, 2013, and claims priority from Japanese Patent Application No. 2012-200475, filed on Sep. 12, 2012, and Japanese Patent Application No. 2013-095388, filed on Apr. 30, 2013, the entire disclosures of which are incorporated herein by reference.

BACKGROUND

1. Technical Field

The present disclosure relates to an imaging device and a signal processing method.

2. Related Art

Recently, as the resolution of a solid-state imaging element such as a charge coupled device (CCD) image sensor and a complementary metal oxide semiconductor (CMOS) image sensor becomes higher, a demand for an information device having a photographing function such as a digital still camera, a digital video camera, a cellular phone such as a smart phone, and a personal digital assistant (PDA) is rapidly increasing. Further, the information device having an imaging function as described above is referred to as an imaging device.

In such an imaging device, as a focus control method which focuses on a major subject, a contrast auto focus (AF) method or a phase difference AF method is employed. Since the phase difference AF method may detect a focusing position with high precision at a high speed as compared with the contrast AF method, the phase difference AF method is widely employed in various imaging devices.

For example, Patent Literature 1 (JP-A-2010-286826) discloses an imaging device which has some of the pixel cells included in an imaging element as a phase difference detecting pixel cell and performs the phase difference AF using a signal read out from the phase difference detecting pixel cell.

The imaging device disclosed in Patent Literature 1 performs shading correction which predicts shadings of a subject image (image A) obtained by being captured by one of a pair of phase difference detecting pixel cells and a subject image (image B) obtained by being captured by the other one of the pair of phase difference detecting pixel cells from lens information, ranging point information, and latest defocus information to adjust a light quantity ratio of the image A and the image B, thereby improving precision of the phase difference AF.

Further, even though it is not a technique of phase difference AF, Patent Literature 2 (JP-A-2009-159093) discloses a lens switching imaging device which uses a live-view image to calculate a shading correction coefficient, as a shading correcting technique.

SUMMARY OF INVENTION

According to Patent Literature 1, a method of correcting shadings of a pair of images having a phase difference using lens information cannot be applied to a lens which does not have lens information.

According to Patent Literature 2, since the shading correcting coefficient is calculated using the live view image, the shading correction may be precisely performed on any of the lenses. However, the technique disclosed in Patent Literature 2 is supposed to use an imaging element which does not include a phase difference detecting pixel cell. Therefore, Patent Literature 2 cannot be applied to a technique of correcting the shading of a pair of images having a phase difference.

In view of above, an object of the present invention is to precisely correct the shading of a pair of images having a phase difference.

An aspect of the present invention provides an imaging device to which an imaging optical system is attachable, including: an imaging element including a plurality of imaging pixel cells that captures an image formed by a luminous flux passing through a pupil area of the imaging optical system, a plurality of first phase difference detecting pixel cells that captures one of a pair of images formed by a pair of luminous fluxes which have passed through different parts of the pupil area of the imaging optical system, and a plurality of second phase difference detecting pixel cells that captures the other one of the pair of images; a correction data generating unit that generates correction data to correct a sensitivity difference of the first phase difference detecting pixel cells and the second phase difference detecting pixel cells using an output signal of the imaging pixel cells, an output signal of the first phase difference detecting pixel cells, and an output signal of the second phase difference detecting pixel cells which are included in a captured image signal obtained by imaging a subject by the imaging element; and a signal correcting unit that corrects at least one of the output signal of the first phase difference detecting pixel cells and the output signal of the second phase difference detecting pixel cells in accordance with the correction data, in which the correction data generating unit calculates a ratio of the output signal of the first phase difference detecting pixel cell and an output signal of the imaging pixel cell which is adjacent to the first phase difference detecting pixel cell and a ratio of an output signal of the second phase difference detecting pixel cell which is adjacent to the first phase difference detecting pixel cell and an output signal of the imaging pixel cell which is adjacent to the second phase difference detecting pixel cell to generate the correction data based on the two ratios.

Another aspect of the present invention provides a signal processing method in an imaging device to which an imaging optical system is attachable, the method including: a correction data generating step of imaging a subject by an imaging element which includes a plurality of imaging pixel cells which captures an image formed by a luminous flux passing through a pupil area of the imaging optical system, a plurality of first phase difference detecting pixel cells which captures one of a pair of images formed by a pair of luminous fluxes which have passed through different parts of the pupil area of the imaging optical system, and a plurality of second phase difference detecting pixel cells which captures the other one of the pair of images and generating which generates correction data to correct a sensitivity difference of the first phase difference detecting pixel cells and the second phase difference detecting pixel cells using an output signal of the imaging pixel cells, an output signal of the first phase difference detecting pixel cells, and an output signal of the second phase difference detecting pixel cells which are included in a captured image signal obtained by the imaging; and a signal correcting step of correcting at least one of the output signal of the first phase difference detecting pixel cells and the output signal of the second phase difference detecting pixel cells in accordance with the correction data, in which in the correction data generating step, a ratio of the output signal of the first phase difference detecting pixel cell and an output signal of the imaging pixel cell which is adjacent to the first phase difference detecting pixel cell and a ratio of an output signal of the second phase difference detecting pixel cell which is adjacent to the first phase difference detecting pixel cell and an output signal of the imaging pixel cell which is adjacent to the second phase difference detecting pixel cell are calculated to generate the correction data based on the two ratios.

With any one of the aspects, it is possible to precisely correct the shading of a pair of images having a phase difference.

DESCRIPTION OF EMBODIMENTS

Hereinafter, an embodiment(s) of the present disclosure will be described with reference to the drawings.

Figure 1:
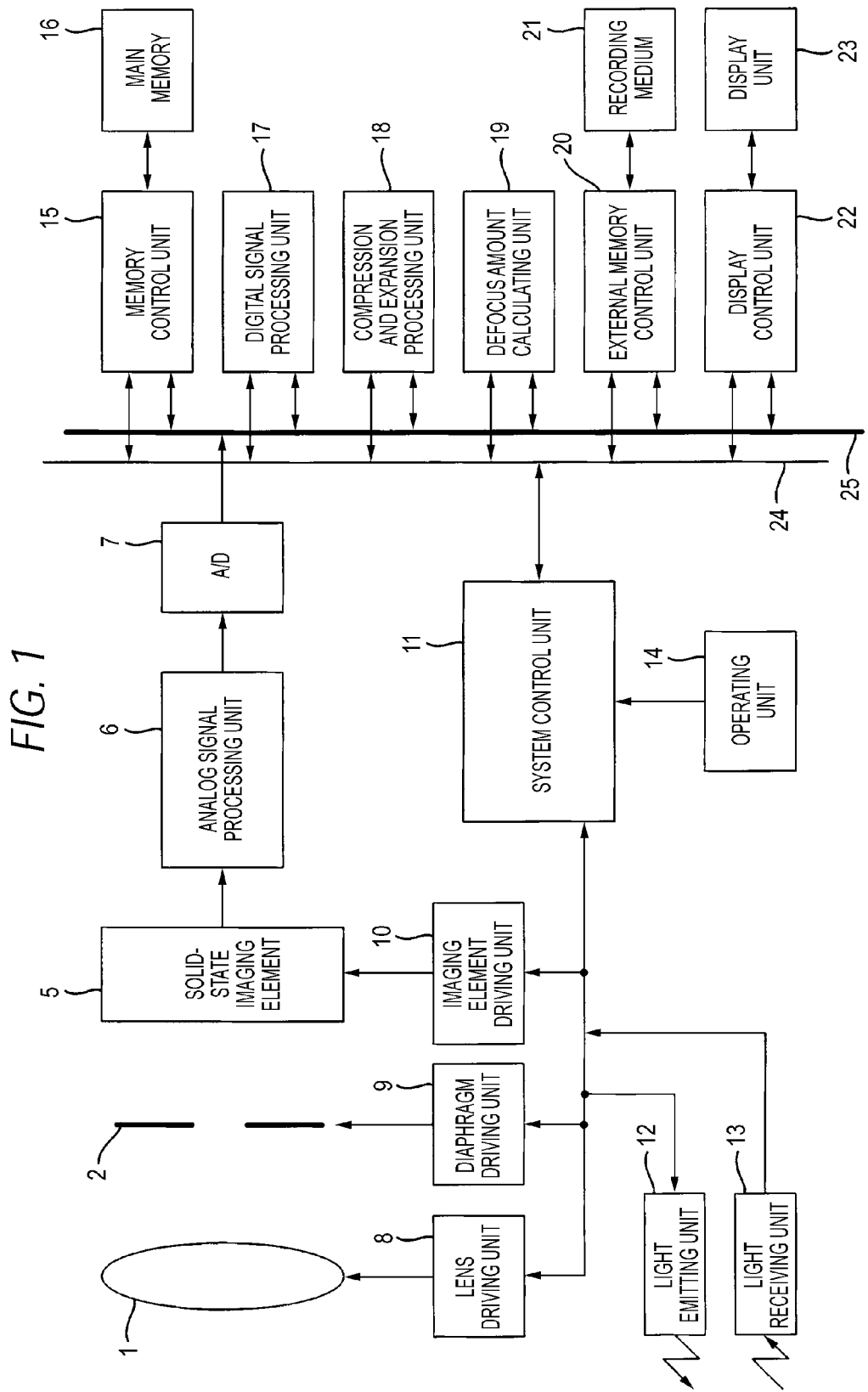
FIG. 1 is a diagram illustrating a schematic configuration of a digital camera as an example of an imaging device for explaining an embodiment of the present disclosure.

FIG. 1 is a diagram illustrating a schematic configuration of a digital camera as an example of an imaging device for explaining an embodiment of the present disclosure.

An imaging system of a digital camera illustrated in FIG. 1 includes a lens device (including a photographing lens 1 and a diaphragm 2) as an imaging optical system and a CMOS solid-state imaging element 5. In an example of FIG. 1, even though the solid-state imaging element 5 is a CMOS type, a CCD type solid-state imaging element may be also used.

The lens device which includes the photographing lens 1 and the diaphragm 2 is attachable to a camera main body and may be replaced by other lens device.

A system control unit 11 which collectively controls an entire electrical control system of the digital camera controls a flash light emitting unit 12 and a light receiving unit 13. Further, the system control unit 11 controls a lens driving unit 8 to adjust a position of a focus lens which is included in the photographing lens 1 or a position of a zoom lens which is included in the photographing lens 1. Further, the system control unit 11 controls an aperture size of the diaphragm 2 through a diaphragm driving unit 9 so as to adjust an exposure amount.

Further, the system control unit 11 controls an imaging element driving unit 10 to drive the solid-state imaging element 5 to output a subject image captured through the photographing lens 1 as a captured image signal. An instruction signal from a user is input to the system control unit 11 through an operating unit 14.

The electrical control system of the digital camera further includes an analog signal processing unit 6 connected to an output of the solid-state imaging element 5 to perform an analog signal processing such as a correlated double sampling processing and an A/D converting circuit 7 which converts an analog signal output from the analog signal processing unit 6 into a digital signal. The analog signal processing unit 6 and the A/D converting circuit 7 are controlled by the system control unit 11. The analog signal processing unit 6 and the A/D converting circuit 7 are embedded in the solid-state imaging element 5 in some cases.

Moreover, the electrical control system of the digital camera includes a main memory 16, a memory control unit 15 which is connected to the main memory 16, a digital signal processing unit 17 which performs an interpolation operation, a gamma correction operation, and an RGB/YC conversion processing on a captured imaging signal output from the A/D converting circuit 7 to generate photographed image data, a compression and expansion processing unit 18 which compresses the photographed image data generated in the digital signal processing unit 17 in a JPEG format or expands the compressed image data, a defocus amount calculating unit 19 which calculates a defocus amount, an external memory control unit 20 to which a detachable recording medium 21 is connected, and a display control unit 22 to which a display unit 23 mounted on a rear surface of a camera is connected. The memory control unit 15, the digital signal processing unit 17, the compression and expansion processing unit 18, the defocus amount calculating unit 19, the external memory control unit 20, and the display control unit 22 are connected to each other by a control bus 24 and a data bus 25 to be controlled by an instruction from the system control unit 11.

Figure 2:
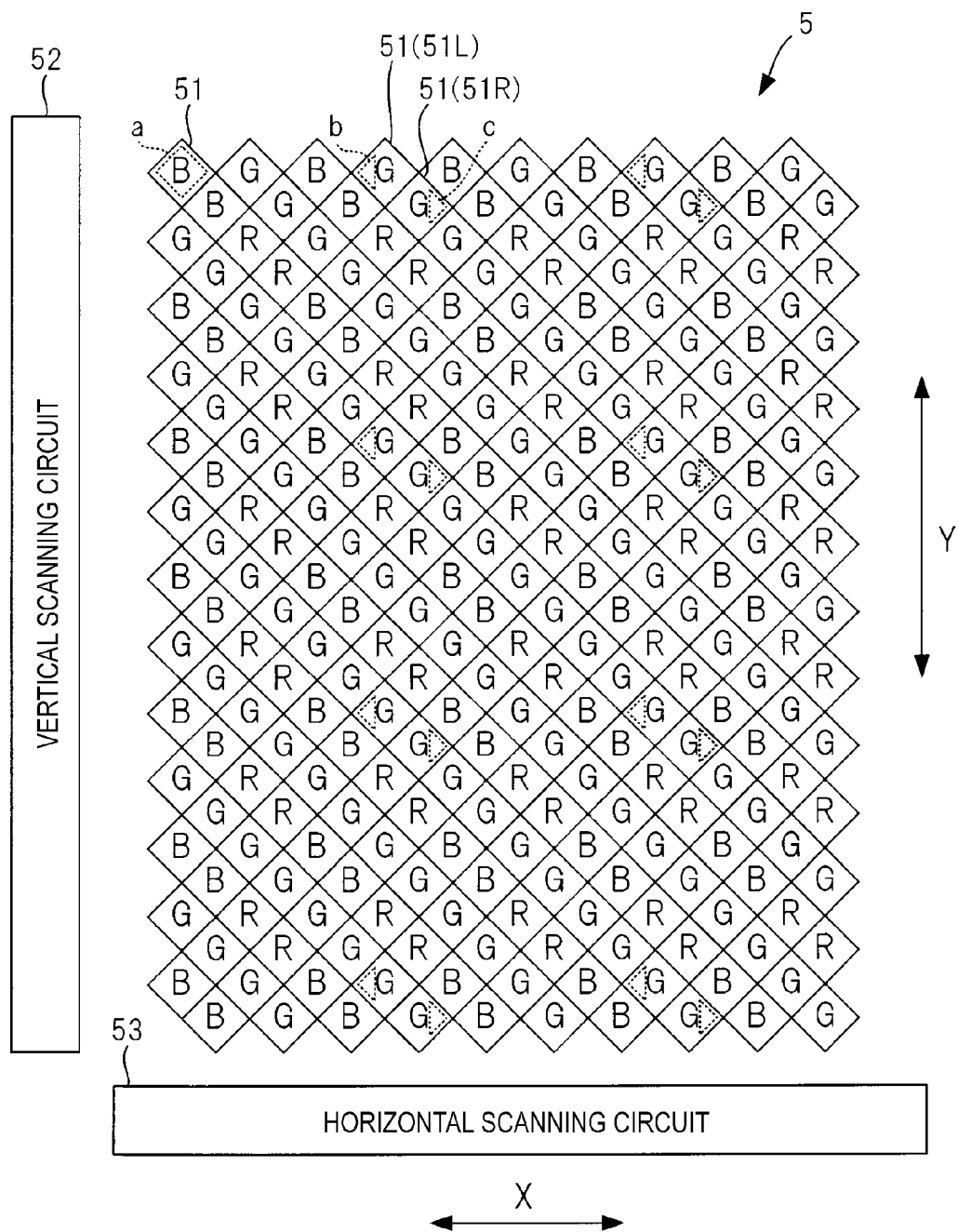
FIG. 2 is a schematic plan view illustrating a configuration of a solid-state imaging element 5 which is mounted in the digital camera illustrated in FIG. 1.

FIG. 2 is a schematic plan view illustrating a configuration of a solid-state imaging element 5 which is mounted in the digital camera illustrated in FIG. 1.

The solid-state imaging element 5 includes a plurality of pixel cells 51 (square blocks in the drawing) which is two-dimensionally arranged in a row direction X and a column direction Y, which is perpendicular to the row direction X. Even though all pixel cells 51 are not illustrated in FIG. 2, actually, millions to tens of millions of pixel cells 51 are two-dimensionally arranged. When an image is captured by a solid-state imaging element 5, output signals from a plurality of pixel cells 51 are individually obtained. A set of the plurality of output signals is referred to as a captured image signal in this specification.

Each pixel cell 51 includes a photoelectric converting unit such as a photodiode, a color filter which is formed above the photoelectric converting unit, and a signal output circuit which outputs a signal in accordance with signal charges which are accumulated in the photoelectric converting unit.

The signal output circuit is a well-known MOS circuit and, for example, is configured to include a charge accumulating unit to which charges accumulated in the photoelectric converting unit are transmitted, a transfer transistor which transfers the charges of the photoelectric converting unit to the charge accumulating unit, a reset transistor which resets a potential of the charge accumulating unit, an output transistor which outputs a signal in accordance with the potential of the charge accumulating unit, and a row selecting transistor which selectively outputs a signal from the output transistor to an output signal line.

In FIG. 2, a pixel cell 51 including a color filter through which a red light component transmits is denoted by a reference character R, a pixel cell 51 including a color filter through which a green light component transmits is denoted by a reference character G, and a pixel cell 51 including a color filter through which a blue light component transmits is denoted by a reference character B.

An arrangement of the plurality of pixel cells 51 is configured such that a plurality of pixel cell rows including a plurality of pixel cells 51 which is lined up in a row direction X is lined up in a column direction Y. Odd numbered pixel cell rows and even numbered pixel cell rows are off-centered by approximately a half of an arrangement pitch of the pixel cells 51 of each pixel cell row in the row direction X.

The arrangement of the color filters which are included in each pixel cell 51 of an odd-numbered pixel cell row is entirely a Bayer arrangement. Further, the arrangement of the color filters which are included in each pixel cell 51 of an even-numbered pixel cell row is also entirely a Bayer arrangement. A pixel cell 51 in an odd-numbered row and a pixel cell 51 which is adjacent to the pixel cell 51 at a right lower side to detect the same color light as the pixel cell 51 form paired pixels.

According to the solid-state imaging element 5 having such a pixel arrangement, output signals of two pixel cells 51 which form the pair pixel are added to achieve a high sensitivity camera or exposure times of the two pixel cells 51 which configure the pair pixel are changed and output signals of the two pixel cells 51 are added to achieve a wide dynamic range of a camera.

In the solid-state imaging element 5, some of a plurality of pixel cells 51 is phase difference detecting pixel cells.

The phase difference detecting pixel cells include a plurality of phase difference detecting pixel cells 51R and a plurality of phase difference detecting pixel cells 51L.

The plurality of phase difference detecting pixel cells 51R receives one (for example, a luminous flux which has passed through a right half of the pupil area) of a pair of luminous fluxes which have passed through different parts of a pupil area of the photographing lens 1 and outputs a signal in accordance with an amount of received light. That is, the plurality of phase difference detecting pixel cells 51R provided in the solid-state imaging element 5 captures an image formed by one of the pair of luminous fluxes which have passed through different parts of the pupil area of the photographing lens 1.

The plurality of phase difference detecting pixel cells 51L receives the other one (for example, a luminous flux which has passed through a left half of the pupil area) of the pair of luminous fluxes and outputs a signal in accordance with an amount of received light. That is, the plurality of phase difference detecting pixel cells 51L provided in the solid-state imaging element 5 captures an image formed by the other one of the pair of luminous fluxes which have passed through different parts of the pupil area of the photographing lens 1.

Further, a plurality of pixel cells 51 (hereinafter, referred to as imaging pixel cells) other than the phase difference detecting pixel cells 51R and 51L captures an image formed by a luminous flux which passes through almost all parts of the pupil area of the photographing lens 1.

A light shielding layer is provided above the photoelectric converting unit of the pixel cell 51 and an aperture which defines a light receiving area of the photoelectric converting unit is formed in the light shielding layer.

A center of the opening (denoted by reference character "a" in FIG. 2) of the imaging pixel cell 51 coincides with a center (a center of a square block) of the photoelectric converting unit of the imaging pixel cell 51. Further, in FIG. 2, in order to simplify the drawing, the aperture "a" is illustrated only in a part of the imaging pixel cells 51.

To the contrary, a center of an opening (denoted by reference character "c" in FIG. 2) of the phase difference detecting pixel cell 51R is off-centered to the right with respect to the center of the photoelectric converting unit of the phase difference detecting pixel cell 51R.

A center of an opening (denoted by reference character "b" in FIG. 2) of the phase difference detecting pixel cell 51L is off-centered to the left with respect to the center of the photoelectric converting unit of the phase difference detecting pixel cell 51L.

In the solid-state imaging element 5, a part of pixel cells 51 on which a green color filter is mounted serves as the phase difference detecting pixel cell 51R or the phase difference detecting pixel cell 51L. Of course, a pixel cell on which a color filter of a different color is mounted may serve as a phase difference detecting pixel cell.

The phase difference detecting pixel cell 51R and the phase difference detecting pixel cell 51L are discretely and periodically arranged in a region where the pixel cells 51 are disposed.

The phase difference detecting pixel cells 51R are disposed at an interval of every three pixel cells in the row direction X in a part (four pixel cell rows which are lined up at an interval of every three pixel cell rows in the example of FIG. 2) of the even-numbered pixel cell rows, in the example of FIG. 2.

In the example of FIG. 2, the phase difference detecting pixel cells 51L are disposed with the same cycle as the phase difference detecting pixel cells 51R in the row direction X in the part (a pixel cell row next to the pixel cell row including the phase difference detecting pixel cell 51R) of the odd-numbered pixel cell rows.

With this configuration, among light component which pass through the aperture "b" of the light shielding layer to be received by the pixel cell 51L, a light component at a left side as seen from the subject of the photographing lens 1 which is provided in the upper portion of the sheet of FIG. 2, that is, a light component entering from a direction in which the subject is watched with a right eye becomes a main component and among light component which pass through the aperture "c" of the light shielding layer to be received by the pixel cell 51R, a light component at a right side as seen from the subject of the photographing lens 1, that is, a light component entering from a direction in which the subject is watched with a left eye becomes a main component.

That is, a captured image signal which is obtained by seeing the subject with the left eye is obtained by all the phase difference detecting pixel cells 51R and a captured image signal which is obtained by seeing the subject with the right eye is obtained by all the phase difference detecting pixel cells 51L. Therefore, stereoscopic image data of the subject may be generated by combining both the image signals or phase difference information may be calculated by correlating both the image signals.

Further, the phase difference detecting pixel cell 51R and the phase difference detecting pixel cell 51L cause the opening of the light shielding layer to be off-centered in a reverse direction to receive the luminous fluxes which pass through the different parts of the pupil area of the photographing lens 1 to obtain phase difference information. However, a structure for obtaining the phase difference information is not limited thereto, but other known structures may be employed.

The solid-state imaging element 5 further includes a vertical scanning circuit 52 and a horizontal scanning circuit 53.

The vertical scanning circuit 52 controls to turn on/off a transfer transistor, a reset transistor, and a row selecting transistor of a signal output circuit which is included in each pixel cell 51.

The horizontal scanning circuit 53 is connected to an output signal line which is provided for every pixel cell column which is formed by pixel cells 51 which are parallel to each other in the column direction Y and sequentially outputs an output signal, which is output from each pixel cell 51 in the pixel cell row to the output signal line, to the outside of the solid-state imaging element 5.

The vertical scanning circuit 52 and the horizontal scanning circuit 53 operate in accordance with an instruction of the imaging element driving unit 10 illustrated in FIG. 1. The imaging element driving unit 10 shifts an exposure period for every pixel cell row by a predetermined time to drive the solid-state imaging element 5 by a so-called rolling shutter method.

The defocus amount calculating unit 19 illustrated in FIG. 1, calculates a phase difference amount which is a relative positional off-centered amount of two images formed by the pair of luminous fluxes using an output signal group read out from the phase difference detecting pixel cell 51L and the phase difference detecting pixel cell 51R and calculates a focus adjustment state of the photographing lens 1 which is an amount deviated from the focused state and a direction thereof in this case, that is, a defocus amount based on the phase difference amount.

The system control unit 11 illustrated in FIG. 1 moves a focus lens included in the photographing lens 1 to a focus position based on the defocus amount calculated by the defocus amount calculating unit 19 to control the focused state of the photographing lens 1. As described above, the system control unit 11 functions as a focus control unit.

Apertures of the phase difference detecting pixel cell 51R and the phase difference detecting pixel cell 51L are reversely off-centered. Therefore, even though positions of the apertures in the off-centered direction (the row direction X of FIG. 2) are almost same, a sensitivity difference may occur between the phase difference detecting pixel cell 51R and the phase difference detecting pixel cell 51L.

Figure 3:
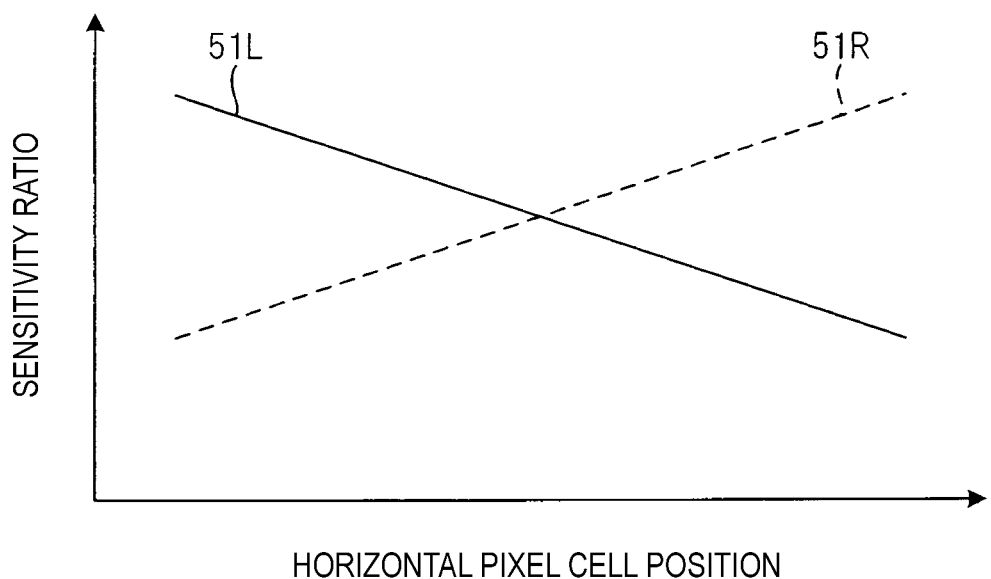
FIG. 3 is a view illustrating a sensitivity ratio of phase difference detecting pixel cells 51R and 51L in a row direction X position in a solid-state imaging element 5.

FIG. 3 is a view illustrating a sensitivity ratio of phase difference detecting pixel cells 51R and 51L in a row direction X position in a solid-state imaging element 5. A straight line indicated by reference character 51R represents a sensitivity ratio of the phase difference detecting pixel cell 51R and a straight line indicated by reference character 51L represents a sensitivity ratio of the phase difference detecting pixel cell 51L.

A sensitivity ratio refers to a ratio of output signals of the phase difference detecting pixel cell and the imaging pixel cell (which detects the same color light component as the phase difference detecting pixel cell) which are adjacent to each other. In this specification, the two adjacent pixel cells mean two pixel cells which are assumed to be adjacent to receive light from substantially the same subject part.

Further, when an output signal level of the phase difference detecting pixel cell is A and an output signal level of the imaging pixel cell is B, the sensitivity ratio is a value represented by A/B or B/A.

The phase difference detecting pixel cells 51R and 51L are also periodically arranged also in the column direction Y. Therefore, data illustrated in FIG. 3 is obtained as a data average of sensitivity ratios of the phase difference detecting pixel cells 51R and 51L whose positions are the same in the row direction X.

Levels of the output signal of the plurality of phase difference detecting pixel cells 51R and the output signal of the plurality of phase difference detecting pixels 51L are different at positions in the row direction X depending on the subject so that it is hard to know an exact shading shape. However, as illustrated in FIG. 3, when a sensitivity ratio which is a ratio of the output signals of the phase difference detecting pixel cell and the imaging pixel cell which is adjacent to the phase difference detecting pixel cell is obtained, a sensitivity distribution (shading shape) of the phase difference detecting pixel cell may be understood.

Further, even though positions of the phase difference detecting pixel cell 51R and the phase difference detecting pixel cell 51L in the row direction X are not exactly same in the solid-state imaging element 5, in FIG. 3, it is assumed that the positions of the phase difference detecting pixel cell 51R and the phase difference detecting pixel cell 51L which are adjacent to each other in the row direction X are same.

The aperture "b" of the phase difference detecting pixel cell 51L is off-centered to the left in FIG. 2. Therefore, light may easily enter the aperture "b" of the phase difference detecting pixel cell 51L which is a left end portion of the solid-state imaging element 5 in FIG. 2, as compared with the center of the solid-state imaging element 5. Meanwhile, light may weakly enter the aperture "b" of the phase difference detecting pixel cell 51L which is a right end portion of the solid-state imaging element 5 in FIG. 2, as compared with the center of the solid-state imaging element 5.

Further, since the aperture "c" of the phase difference detecting pixel cell 51R is off-centered to be reverse to the aperture of the phase difference detecting pixel cell 51L in the row direction X, a characteristic of the sensitivity ratio thereof is opposite to the phase difference detecting pixel cell 51L.

Therefore, as illustrated in FIG. 3, the sensitivity ratio of the phase difference detecting pixel cell 51L is lowered toward the right end portion from the left end portion of the solid-state imaging element 5. Further, the sensitivity ratio of the phase difference detecting pixel cell 51R is increased toward the right end portion from the left end portion of the solid-state imaging element 5.

Further, the sensitivity ratio of the phase difference detecting pixel cell 51L and the sensitivity ratio of the phase difference detecting pixel cell 51R are substantially same at the center of the solid-state imaging element 5.

As described above, when there is a sensitivity difference between the phase difference detecting pixel cell 51R and the phase difference detecting pixel cell 51L, a result of the correlation operation of an output signal group obtained from the plurality of phase difference detecting pixel cells 51R and an output signal group obtained from the plurality of phase difference detecting pixel cells 51L may have an error. Therefore, a phase difference amount between an image captured by the phase difference detecting pixel cell 51R and an image captured by the phase difference detecting pixel cell 51L cannot be accurately calculated.

Therefore, in the digital camera according to the embodiment, the defocus amount calculating unit 19 serves as a signal corrector which corrects the output signal of the phase difference detecting pixel cell 51R and the output signal of the phase difference detecting pixel cell 51L based on the correction data in order to remove sensitivity difference between the phase difference detecting pixel cell 51R and the phase difference detecting pixel cell 51L and also serves as a phase difference calculating unit which calculates a phase difference amount using the corrected output signals.

The defocus amount calculating unit 19 serves as a correction data generating unit which generates the correction data using the output signal of each of the phase difference detecting pixel cells 51R and 51L and an output signal of the imaging pixel cell 51 which are adjacent to each of the phase difference detecting pixel cells 51R and 51L, among the captured image signals obtained by capturing an image by the solid-state imaging element 5 and a recording control unit which records the generated correction data in a recording medium.

Figure 4:
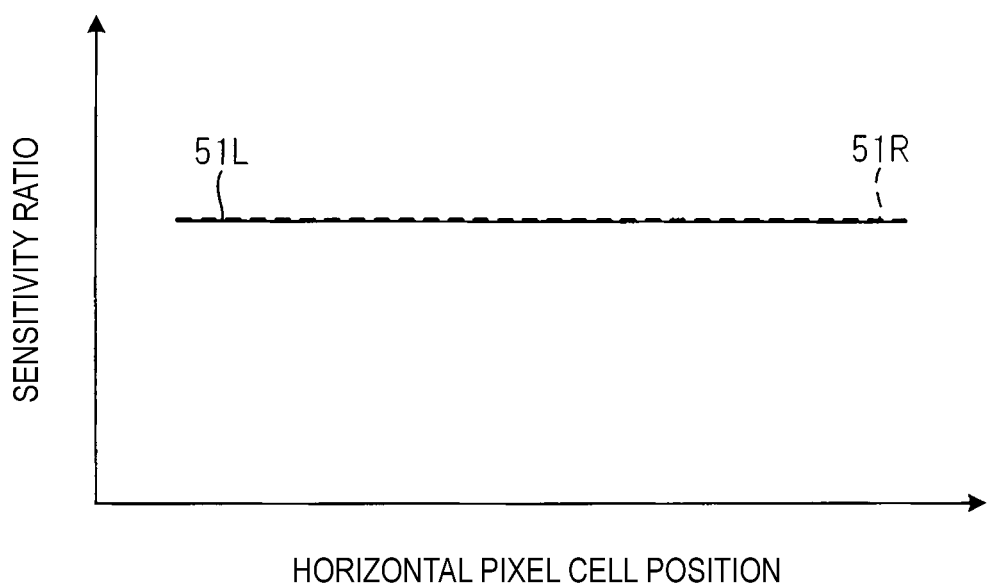
FIG. 4 is a view illustrating a status having a sensitivity ratio of the phase difference detecting pixel cells 51R and 51L illustrated in FIG. 3.

For example, the defocus amount calculating unit 19 calculates the sensitivity ratio of the phase difference detecting pixel cell 51R and the sensitivity of the phase difference detecting pixel cell 51L for every position in the row direction X using the captured image signal to generate data illustrated in FIG. 3. As illustrated in FIG. 4, the defocus amount calculating unit 19 generates a coefficient which will be multiplied by the output signals of the phase difference detecting pixel cells 51R and 51L and at which the sensitivity ratio of the phase difference detecting pixel cell 51R and the sensitivity ratio of the phase difference detecting pixel cell 51L are equal to each other, as the correction data.

Alternatively, the defocus amount calculating unit 19 generates a coefficient which is required to match the graph of the sensitivity ratio of the phase difference detecting pixel cell 51R and the graph of the sensitivity ratio of the phase difference detecting pixel cell 51L illustrated in FIG. 3 and will be multiplied by the output signals of the phase difference detecting pixel cell 51L, as the correction data.

Alternatively, the defocus amount calculating unit 19 generates a coefficient which is required to match the graph of the sensitivity ratio of the phase difference detecting pixel cell 51L and the graph of the sensitivity ratio of the phase difference detecting pixel cell 51R illustrated in FIG. 3 and will be multiplied by the output signals of the phase difference detecting pixel cell 51R, as the correction data.

An operation of a digital camera configured as described above will be described.

Figure 5:
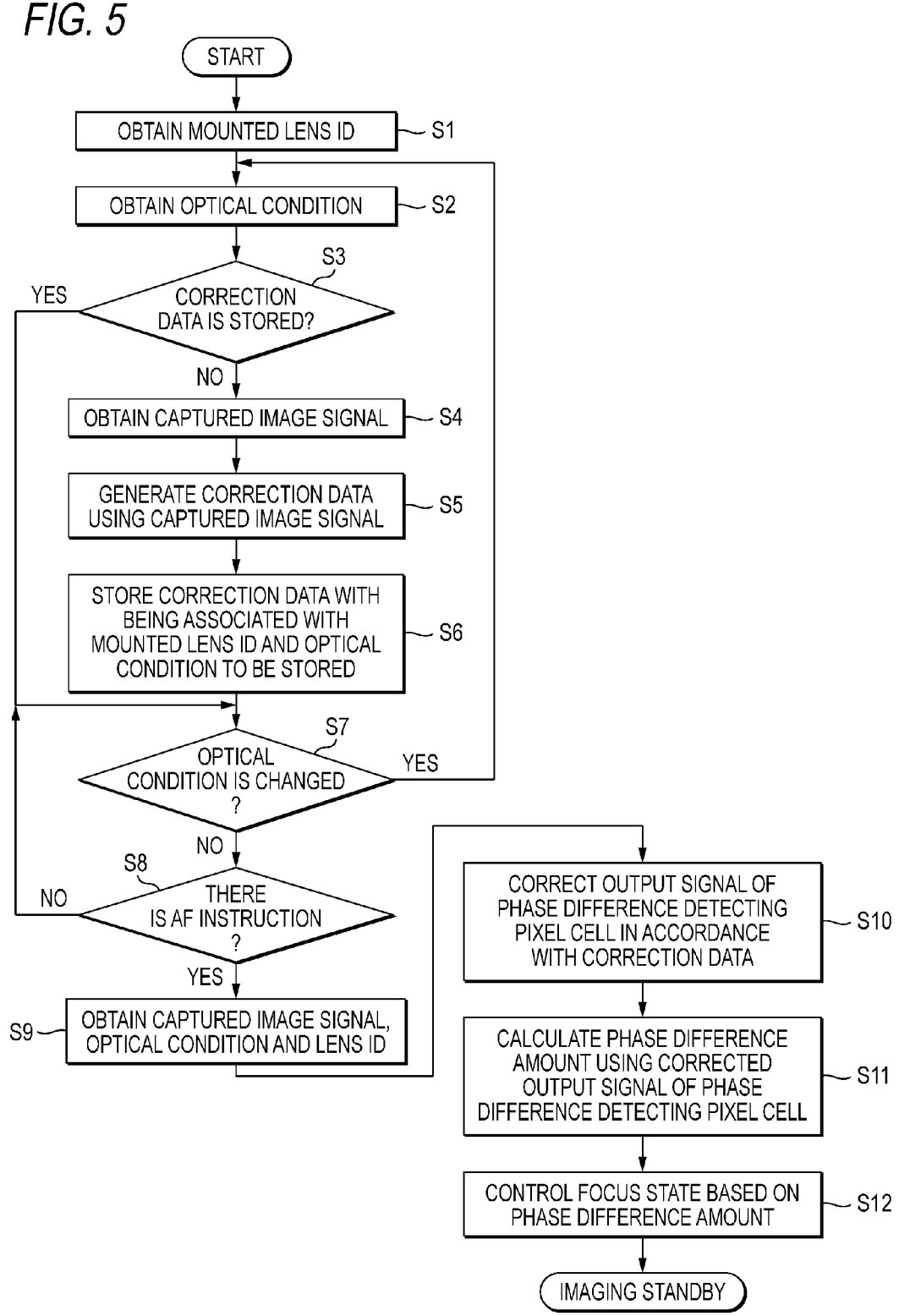
FIG. 5 is a flow chart for explaining an operation of the digital camera illustrated in FIG. 1.

FIG. 5 is a flow chart for explaining an operation of the digital camera illustrated in FIG. 1.

In a photographing mode, the system control unit 11 starts imaging (imaging a moving image) by the solid-state imaging element 5 to display a live view image on a display unit 23. When the imaging starts, the captured image signal output from the solid-state imaging element 5 is processed by the digital signal processing unit 17 and an image based on processed captured image data is displayed on the display unit 23. Therefore, a subject which is being imaged is checked in real time by the image which is displayed on the display unit 23.

Meanwhile, in the photographing mode, the defocus amount calculating unit 19 obtains an lens ID which is identification information to identify a lens device which is mounted on the camera main body, from the system control unit 11 (step S1).

Next, the defocus amount calculating unit 19 obtains information on an optical condition of the lens device from the system control unit 11 (step S2). The optical condition is information on a parameter which determines an angle of a ray which is incident onto the solid-state imaging element 5 and includes information such as a diaphragm F value and a focal distance at the time of imaging.

Next, when the lens ID obtained in step S1 and the correction data corresponding to a combination of the optical condition obtained in step S2 are stored in the main memory 16 (Yes in step S3), the defocus amount calculating unit 19 proceeds the process to step S7 or when the correction data is not stored in the main memory 16 (No in step S3), the defocus amount calculating unit 19 proceeds the process to step S4.

In step S4, the defocus amount calculating unit 19 obtains the captured image signal output from the solid-state imaging element 5. The defocus amount calculating unit 19 generates data illustrated in FIG. 3 using the obtained captured image signal and generates the correction data from the data (step S5).

Next, the defocus amount calculating unit 19 associates the generated correction data with the lens ID obtained in step S1 and information of the optical condition obtained in step S2 to store the associated correction data in the main memory 16 (step S6).

After step S6, when the optical condition of the lens device is changed (YES in step S7), the defocus amount calculating unit 19 returns the process to step S2 and when the optical condition of the lens device is not changed (No in step S7), the defocus amount calculating unit 19 proceeds the process to step S8.

The defocus amount calculating unit 19 determines whether an instruction to perform the phase difference AF is issued to the system control unit 11 in step S8, and when the AF instruction is issued (YES in step S8), the defocus amount calculating unit 19 proceeds the process to step S9 and when the AF instruction is not issued (NO in step S8), returns the process to step S7.

In step S9, the defocus amount calculating unit 19 obtains the captured image signal obtained by capturing an image by the solid-state imaging element 5 in accordance with the AF instruction and, information on the optical condition at the time of imaging, and the lens ID of the lens device which is currently mounted from the system control unit 11.

Next, the defocus amount calculating unit 19 reads out correction data corresponding to the lens ID and the combination of the optical conditions from the main memory 16 and corrects the output signal of the phase difference detecting pixel cell included in the captured image signal obtained in step S9 using this (step S10).

Next, the defocus amount calculating unit 19 performs correlation operation using the corrected output signal of the phase difference detecting pixel cell and calculates a phase difference amount between an image captured by the phase difference detecting pixel cell 51R and an image captured by the phase difference detecting pixel cell 51L to calculate a defocus amount based on the phase difference amount (step S11).

After step S11, the system control unit 11 performs focus control which moves the focus lens to a focus position based on the defocus amount (step S12) and then goes into an imaging standby state.

Further, when the lens device is replaced at an arbitrary timing of the photographing mode, the process after step S1 is performed at the timing. Further, in the imaging standby state, when the optical condition is changed, the process after step S2 is performed at that time.

As described above, according to the digital camera illustrated in FIG. 1, the correction data for correcting a sensitivity difference of the phase difference detecting pixel cell 51R and the phase difference detecting pixel cell 51L may be generated using the captured image signal obtained by capturing an image by the solid-state imaging element 5. Therefore, there is no need to generate correction data corresponding to all kinds of lens device which may be mounted in the digital camera in advance to be stored in the camera main body, so that the number of processes of adjusting a camera may be reduced.

Further, even in the case of a lens device which cannot obtain detailed information except for the lens ID, the correction data may be generated and stored only by mounting the lens device and setting the photographing mode. Therefore, even when any of lens device is mounted, the phase difference AF may be precisely performed.

Further, in the description of FIG. 5, the generated correction data is stored to be associated with the lens ID and the optical condition and then the sensitivity ratio of the phase difference detecting pixel cell is corrected using the stored correction data, but the present disclosure is not limited thereto.

For example, whenever the AF instruction is issued, the defocus amount calculating unit 19 may generate the correction data from the captured image signal, correct the output signal of the phase difference detecting pixel cell using the correction data, and calculate the phase difference amount using the corrected signal. By doing this, a memory capacity may be reduced.

Further, even after storing the correction data corresponding to any of lens ID and the optical condition in the main memory 16, correction data corresponding to the lens ID and the optical condition may be regularly generated again. By doing this, even when the performance of the lens device or the performance of the solid-state imaging element 5 is slightly changed due to long-term usage of the lens device, exact correction data may be generated in accordance with the situation.

Further, according to the digital camera illustrated in FIG. 1, since the solid-state imaging element 5 having three types of pixel cells including the imaging pixel cell 51, the phase difference detecting pixel cell 51R, the phase difference detecting pixel cell 51L is used, data corresponding to the shading as illustrated in FIG. 3 may be generated by capturing an image once. Therefore, a time to generate the correction data is shortened so that it is specifically advantageous in that the correction data is generated whether the AF instruction is performed.

Further, in the above description, the correction data generated by the defocus amount calculating unit 19 is associated with the identification information of the lens device to be recorded in the main memory 16 of the digital camera. However, the correction data generated by the defocus amount calculating unit 19 may be associated with the identification information of the digital camera to be recorded in a recording medium in the lens device.

Figure 6:
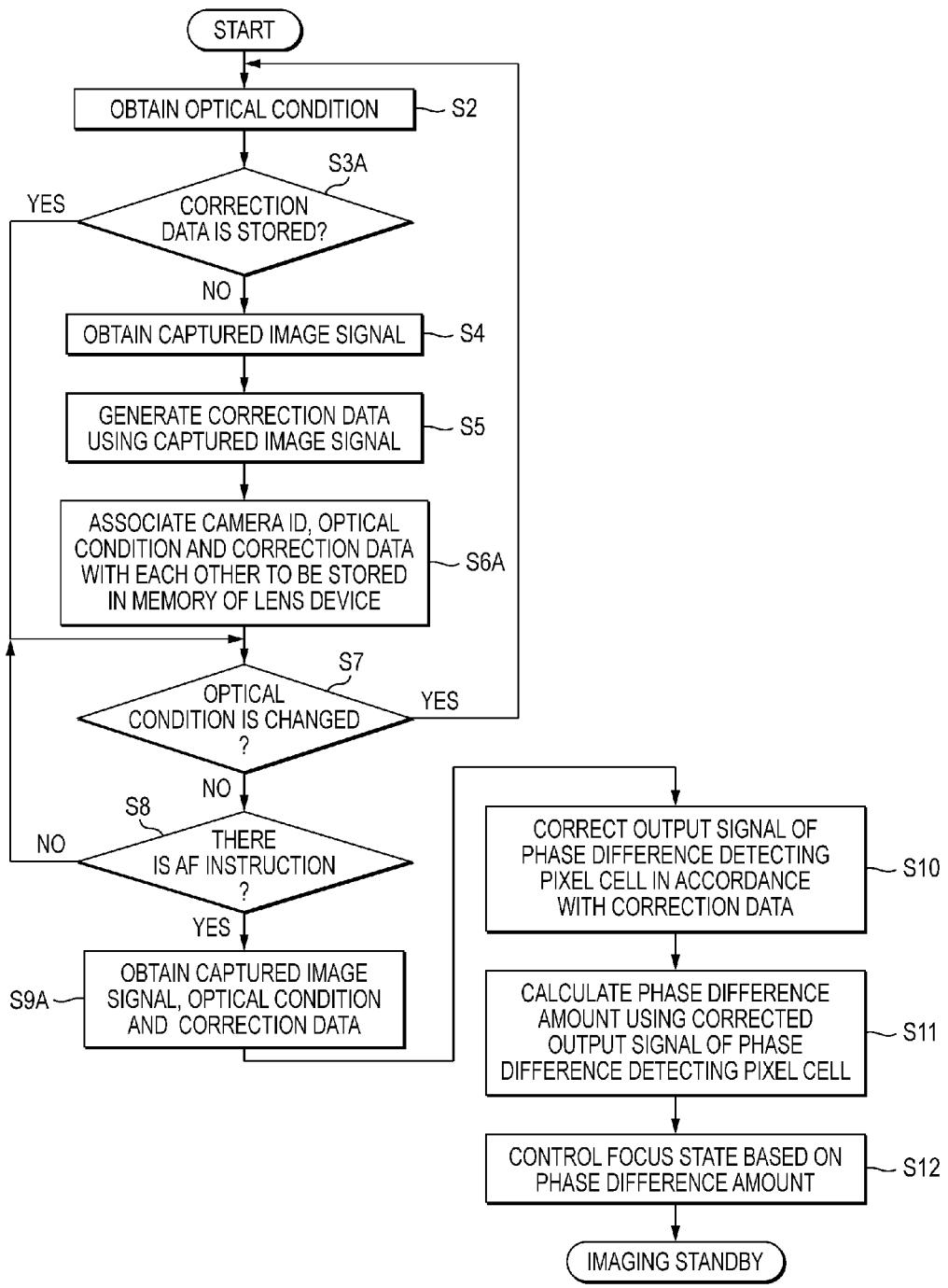
FIG. 6 is a flow chart for explaining a modified embodiment of an operation of the digital camera illustrated in FIG. 1.

FIG. 6 is a flow chart for explaining an operation of the digital camera when correction data generated by the defocus amount calculating unit 19 is recorded in the recording medium in the lens device. In FIG. 6, the same processes as the processes illustrated in FIG. 5 are denoted by the same reference numerals and descriptions thereof will be omitted.

When the mode is set to a photographing mode, the defocus amount calculating unit 19 obtains information on an optical condition of the lens device from the system control unit 11 in step S2.

Next, when a camera ID of the digital camera stored in the main memory 16 and the correction data corresponding to a combination of the optical condition obtained in step S2 are stored in a memory in the lens device (YES in step S3A), the defocus amount calculating unit 19 proceeds the process to step S7 or when the correction data is not stored in the memory in the lens device (NO in step S3A), the defocus amount calculating unit 19 proceeds the process to step S4.

After step S4 and S5, the defocus amount calculating unit 19 associates the correction data generated in step S5 and the camera ID with the information on the optical condition obtained in step S2 to store the associated correction data in the memory in the lens device via the system control unit 11 (step S6A).

When YES in step S8, the defocus amount calculating unit 19 obtains the captured image signal obtained by capturing an image by the solid-state imaging element 5 in accordance with the AF instruction and the information of the optical condition at the time of imaging from the system control unit 11 and obtains the correction data corresponding to the information of the optical condition from the memory in the lens device via the system control unit 11 (step S9A).

Next, the defocus amount calculating unit 19 performs correction in accordance with the obtained correction data (step S10) and the processes of steps S11 and S12 are performed.

Also in this case, when the lens device is replaced at an arbitrary timing of the imaging mode, the process after step S2 is performed at the timing.

Next, a modified embodiment of a correction data generating method in the digital camera illustrated in FIG. 1 will be described. In this modified embodiment, the defocus amount calculating unit 19 generates the correction data not using the captured image signal which is obtained by one-time imaging, but using a plurality of captured image signals obtained by imaging a plurality of times.

Figure 7:
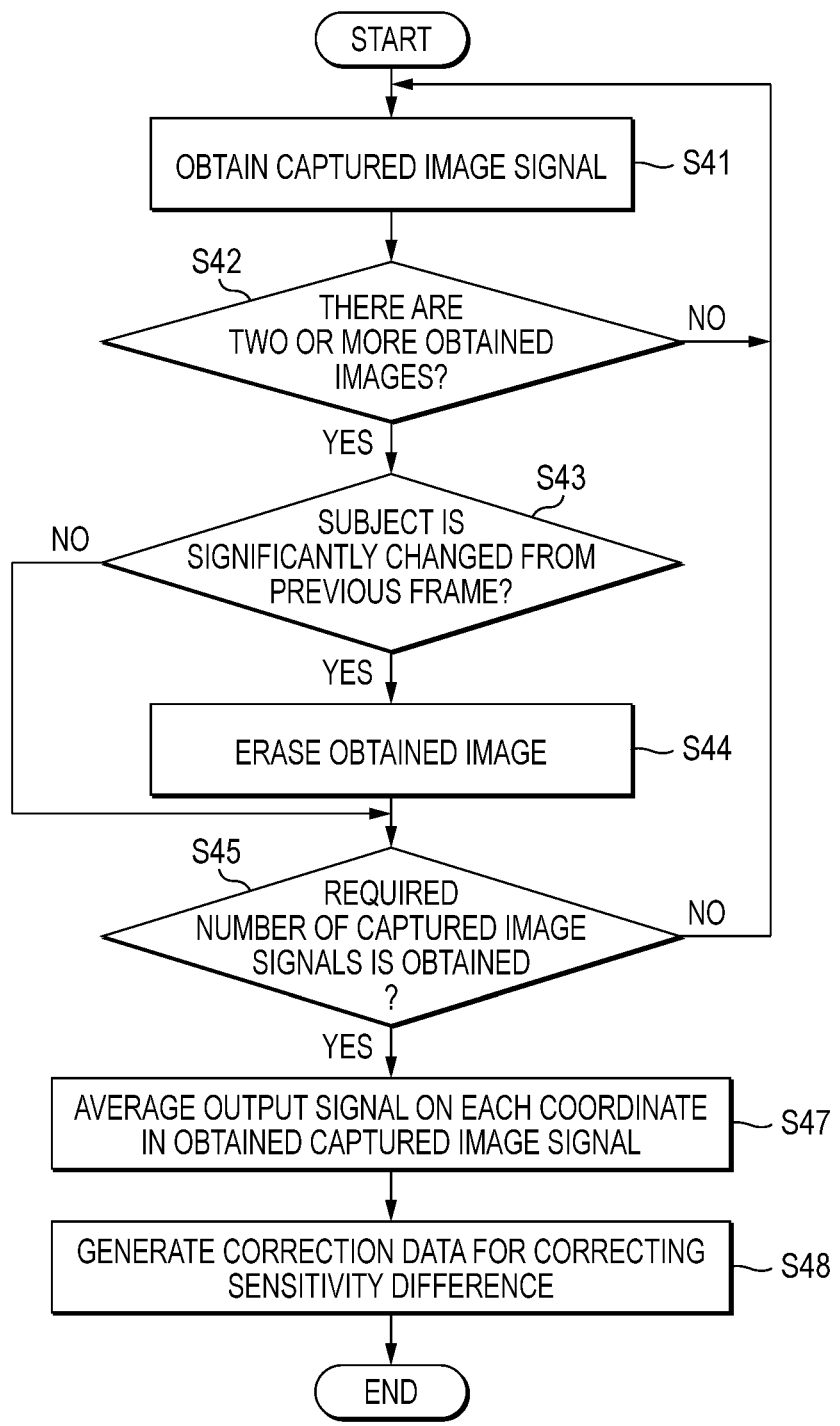
FIG. 7 is a flow chart illustrating a modified embodiment of a process of steps S4 to S6 of FIG. 5.

FIG. 7 is a flow chart illustrating a modified embodiment of a process of steps S4 to S5 of FIG. 5. The modified embodiment is also applied to FIG. 6.

When a mode is set to a photographing mode, the solid-state imaging element 5 starts continuous imaging (capturing a moving image) in order to display a live view image and the captured image signals obtained by the imaging are stored in the main memory 16.

After step S3 of FIG. 5 or step S3A of FIG. 6 and in step S41, the defocus amount calculating unit 19 obtains a captured image signal G(n) for displaying a live view image obtained at an arbitrary time T(n) after step S2 of FIGS. 5 and 6 from the main memory 16 and stores the captured image signal G(n) in an internal memory.

Next, when the number of captured image signals stored in the internal memory is two or more (YES in step S42), the defocus amount calculating unit 19 performs the process of step S43 and when the number of captured image signals stored in the internal memory is less than two (NO in step S42), the defocus amount calculating unit 19 changes "n" of T(n) into "n+1" and performs the process of step S41. Further, for the time T(n), as the number of "n" is larger, the time is latest.

When two or more captured image signals are stored in the internal memory, the defocus amount calculating unit 19 compares the captured image signal G(n) with the captured image signal G(n+1) in step S43 and determines whether there is a big difference between subject images based on the signals.

Specifically, the defocus amount calculating unit 19 calculates a difference between signals of the captured image signal G(n) and the captured image signal G(n+1) on the same coordinate and determines that the subject based on the captured image signal G(n+1) is significantly different from the subject based on the captured image signal G(n) when the difference exceeds a predetermined threshold value.

Meanwhile, when the difference is equal to or smaller than the predetermined threshold value, the defocus amount calculating unit 19 determined that there is no big difference between the subject based on the captured image signal G(n) and the subject based on the captured image signal G(n+1).

When the determination of step S43 is YES, the defocus amount calculating unit 19 erases the captured image signal G(n+1) stored in the internal memory (step S44) and then performs the process of step S45.

Figure 8:
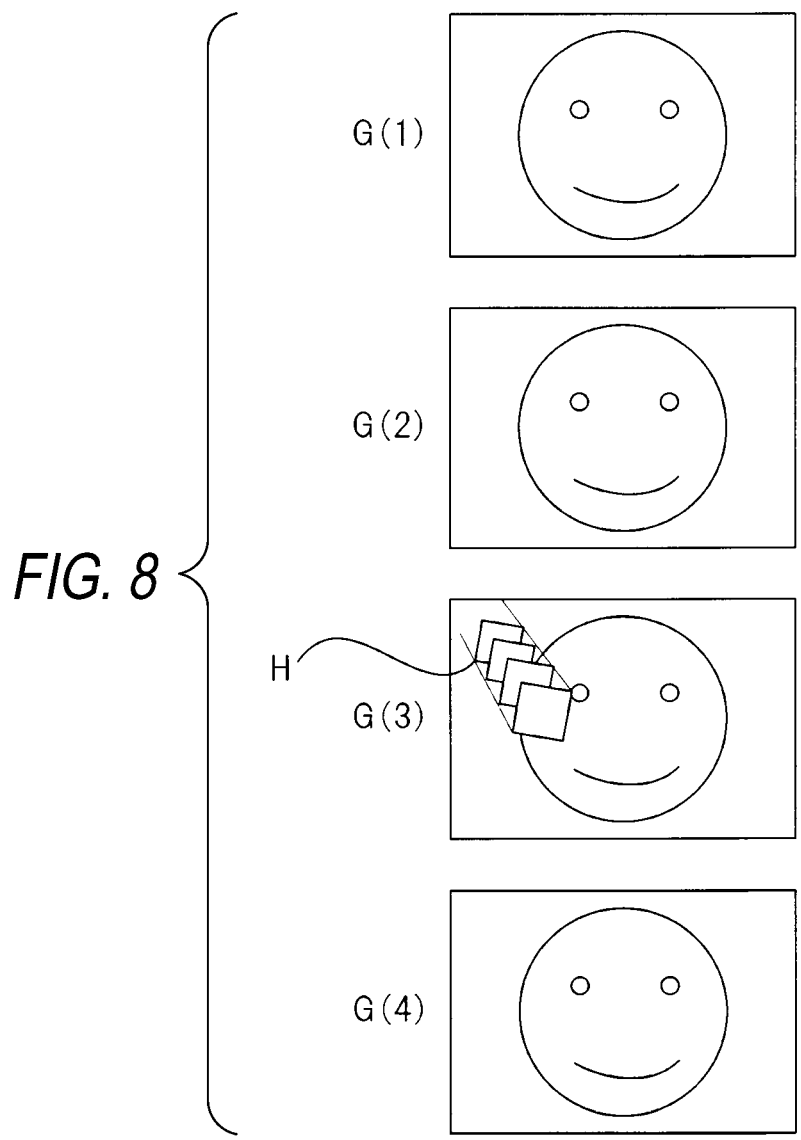
FIG. 8 is a view for explaining step S44 of FIG. 7.

For example, as illustrated in FIG. 8, when there are captured image signals G(1) to G(4) and sunlight H enters only the captured image signal (G3), the defocus amount calculating unit 19 erases the captured image signal G(3) from the internal memory.

When the determination in step S43 is NO, the defocus amount calculating unit 19 does not perform the process of step S44 but performs the process of step S45.

In step s45, the defocus amount calculating unit 19 determines whether the number of captured image signals stored in the internal memory reaches a predetermined number (this number will be referred to as M). When the determination in step S45 is YES, the defocus amount calculating unit 19 performs the process of step S47 and when the determination in step S45 is NO, the defocus amount calculating unit 19 changes "n" to "n+1" and performs the process of step S41.

In step S47, the defocus amount calculating unit 19 performs a process of calculating an average of output signals of M captured image signals on the same coordinate which are stored in the internal memory for all coordinates (step S47). That is, an average of M captured image signals is calculated to generate one captured image signal.

Next, the defocus amount calculating unit 19 generates the correction data using one averaged captured image signal obtained in the result of step S47, as described above (step S48).

As described above, in the modified embodiment, the defocus amount calculating unit 19 generates the correction data using the captured image signal obtained from an average of the plurality of captured image signals. A random noise which is included in each output signal may be reduced by calculating an average of the plurality of captured image signals. Therefore, an SN ratio of the averaged captured image signal is improved, so that reliability of the correction data to be generated may be high.

Further, when a noise reduction effect obtained by calculating the average of the plurality of captured image signals is changed into an Ev value, Ev may be represented by the following equation.

$$Ev = (1/2) * \log_2 M$$

(Here, M is the number of captured image signals to be averaged)

For example, when M=2, it means that the same noise performance as the case when an Ev value of the captured image signal before being averaged at the time of capturing is increased by 0.5 may be obtained.

The number M of captured image signals required to perform the averaging may be determined depending on the noise performance required to precisely calculate data of the sensitivity ratio of FIG. 3 and an ISO sensitivity at the time of imaging when the captured image signal before calculating an average is obtained.

For example, it is assumed that a required noise performance is approximately ISO100 and an ISO sensitivity at the time of imaging is ISO800. In this case, when ISO800 and ISO100 are changed into Ev values, the difference is "3". When Ev=3 is plugged in Equation, M=64. Therefore, at a time when a required number of captured image signals determined in step S45 reaches 64, when the obtaining of the captured image signal ends, highly reliable correction data may be obtained.

Further, the noise performance required to obtain the highly reliable correction data changes depending on the noise performance of the solid-state imaging element 5. Therefore, a required noise performance may be determined as a value depending on the performance of the solid-state imaging element 5 mounted in the digital camera.

In addition, FIG. 7 is a flow chart when it is supposed to average captured image signals. However, the averaging may be unnecessary in some photographing condition (a brightness of a subject) or a noise performance. Therefore, after step S3: NO of FIG. 5 (or NO in step S3A of FIG. 6), when the defocus amount calculating unit 19 determines whether the averaging is required and determines that the averaging is required (for example, a necessary noise performance is approximately ISO100 and the ISO sensitivity at the time of imaging is larger than ISO200), the process after step S41 of FIG. 7 is performed after setting M. When the defocus amount calculating unit 19 determines that the averaging is not required (for example, a necessary noise performance is approximately ISO100 and the ISO sensitivity at the time of imaging is larger than that of ISO100), the process after step S4 of FIG. 5 may be performed.

As described above, in the modified embodiment illustrated in FIG. 7, M captured image signals are required to generate correction data. Generally, in the moving image capturing to display a live view image, a frame rate (the number of captured image signals (frames) output for a unit time) is fixed.

For example, when the frame rate is 30 frames per second, if M is 60, at least two seconds is required until the correction data is generated. To the contrary, when the frame rate is increased, a time to generate the correction data may be shortened.

In the modified embodiment of FIG. 7, the defocus amount calculating unit 19 instructs the system control unit 11 to increase the frame rate so that the system control unit 11 may be controlled to increase the frame rate and then the process after step S41 may be performed.

Figure 9:
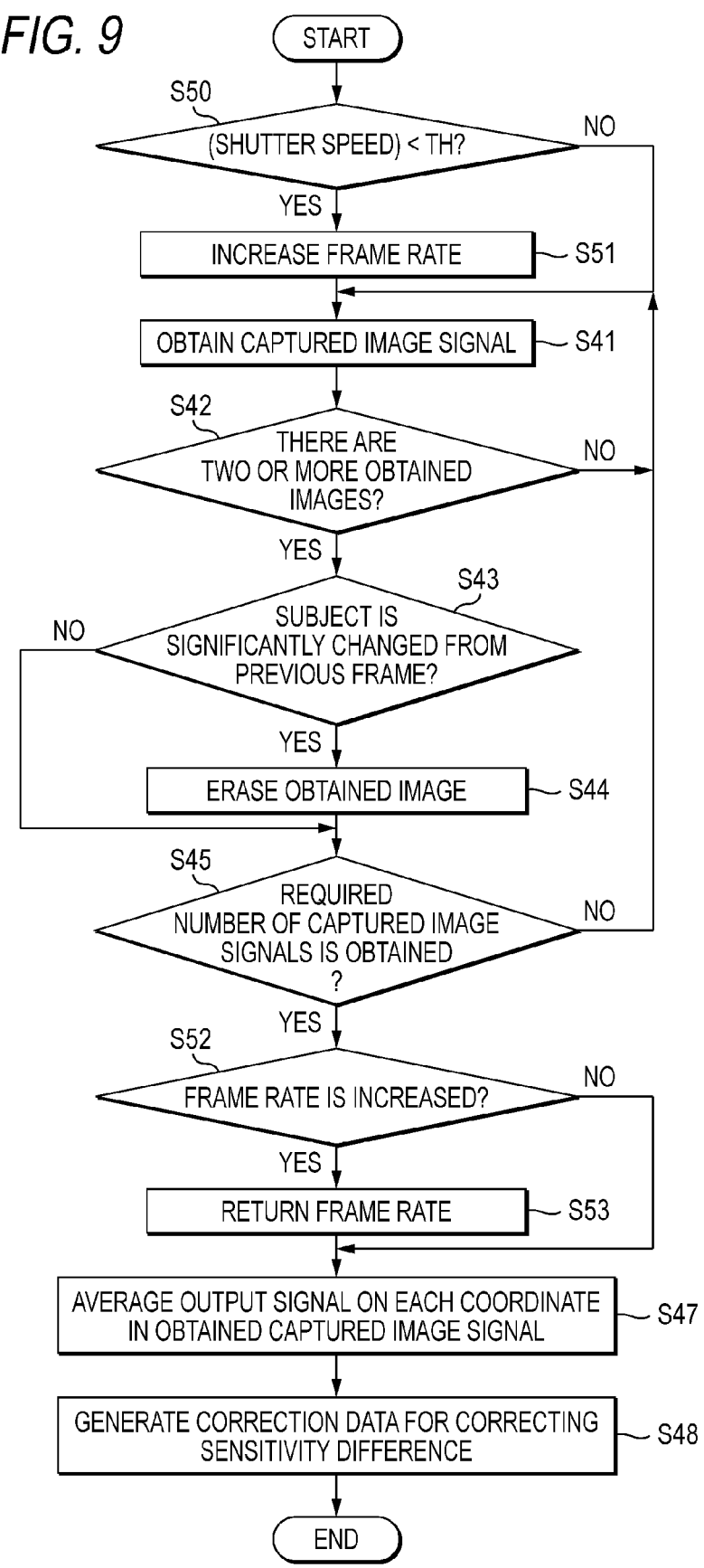
FIG. 9 is a view illustrating a modified embodiment of the flow chart illustrated in FIG. 7.

FIG. 9 is a view illustrating a modified embodiment of the flow chart illustrated in FIG. 7. In FIG. 9, the same processes as the processes illustrated in FIG. 7 are denoted by the same reference numerals and descriptions thereof will be omitted.

First, the defocus amount calculating unit 19 obtains information on an exposure time (shutter speed) at each imaging to display a live view image, from the system control unit 11 and determines whether the shutter speed is smaller than a threshold value TH (step S50).

When the shutter speed is smaller than the threshold value TH (YES in step S50), the defocus amount calculating unit 19 instructs the system control unit 11 to increase the frame rate (for example, to twice a default value of the frame rate while imaging a moving image to display a live view image) (step S51) and then performs the process after step S41.

Meanwhile, when the shutter speed is equal to or larger than the threshold value TH (NO in step S50), the defocus amount calculating unit 19 does not perform the process of step S51 and but performs the process after step S41.

The system control unit 11 which is instructed to increase the frame rate in step S51 increases the frame rate to twice the default value. By doing this, a time when the number of captured image signals reaches M may be halved as compared with a case when the frame rate is fixed to the default value.

As described above, in this modified embodiment, the system control unit 11 serves as a frame rate control unit which controls to increase the frame rate while capturing an image to obtain M captured image signals from a default frame rate while capturing a moving image in accordance with the exposure time of each frame which is set when the moving image is captured.

Further, when the frame rate is increased, it means that a time required to obtain one captured image signal (hereinafter, referred to as a frame obtaining time) is shortened. When the frame rate is 30 frames per second, the frame obtaining time is 1/30 seconds.

Meanwhile, the shutter speed cannot be larger than the frame obtaining time. Therefore, in this modified embodiment, in step S50, it is determined whether to perform the process of step S51, in accordance with the shutter speed.

Specifically, the frame obtaining time when the frame rate is increased in step S51 is set as a threshold value TH.

For example, it is assumed that a default frame rate is 30 frames per second and a frame rate set in step S51 is 60 frames per second. In this case, the threshold value TH is 1/60 seconds.

That is, when the shutter speed in each imaging to display a live view image is 1/40 seconds, the process of step S51 is not performed. In contrast, when the shutter speed in each imaging to display a live view image is 1/100 seconds, the process of step S51 is performed.

When the process after step S41 starts and the number of captured image signals in step S45 reaches M (YES in step S45), the defocus amount calculating unit 19 instructs the system control unit 11 to return the frame rate to a default value when the frame rate is larger than the default value (YES in step S52) and then performs the process after step S47. In accordance with this instruction, the system control unit 11 controls to return the frame rate to the default value.

Meanwhile, when the frame rate is a default value (NO in step S52), the defocus amount calculating unit 19 does not perform the process of step S53 and performs the process after step S47.

As described above, according to the modified embodiment of FIG. 8, when the correction data is generated using a plurality of captured image signals, a time to generate correction data may be shortened.

In the above description, the defocus amount calculating unit 19 generates data of sensitivity ratio illustrated in FIG. 3 using the captured image signal in step S5 of FIG. 5, step S48 of FIG. 7, and step S48 of FIG. 9 and generates the correction data based on this data.

When a high brightness subject is imaged and output signals of the phase difference detecting pixel cell and the imaging pixel cell which is adjacent to the phase difference detecting pixel cell are saturated, an exact value of sensitivity ratio data cannot be obtained.

Figure 10:
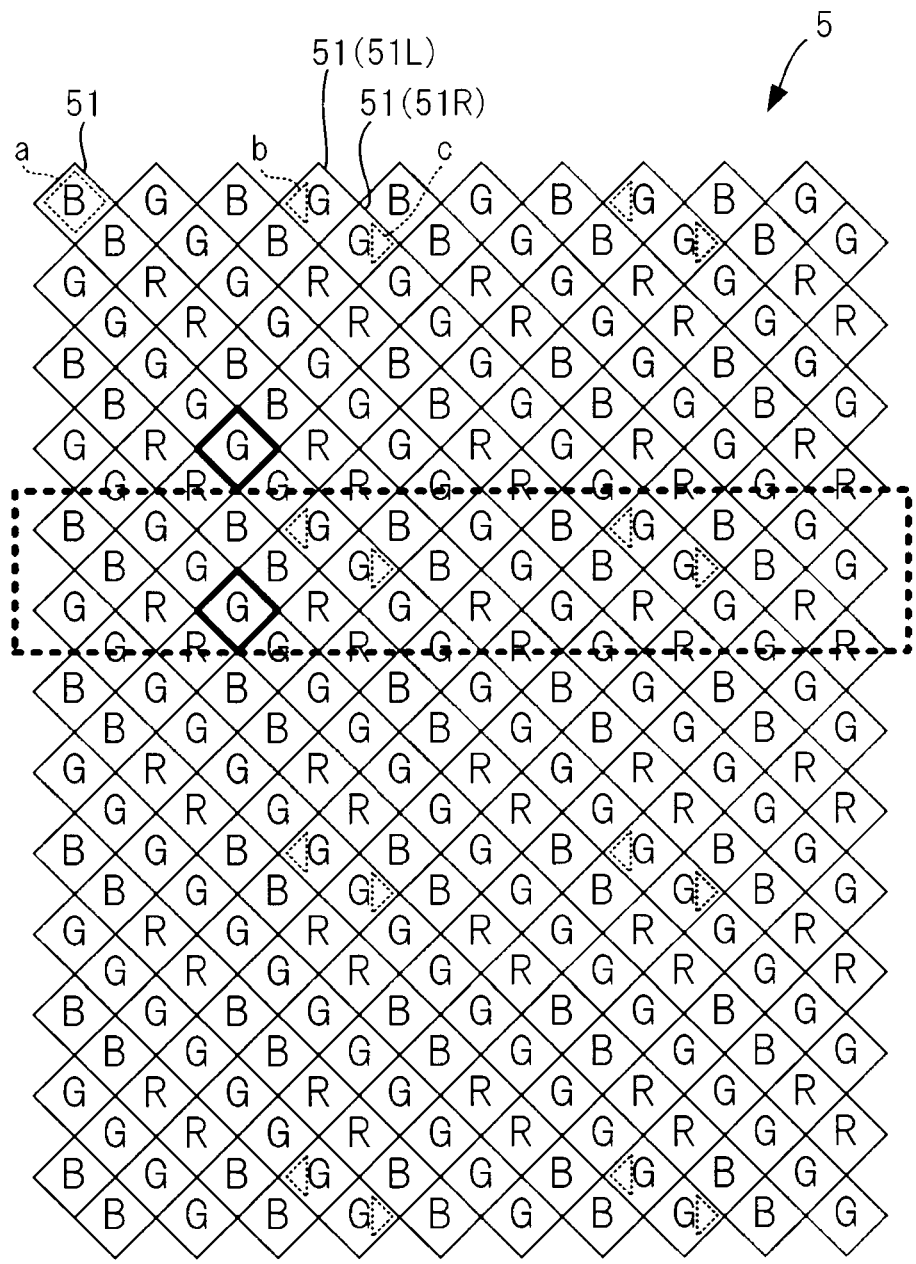
FIG. 10 is a view illustrating a state when an edge of a subject is caught by a solid-state imaging element.

Further, as illustrated in FIG. 10, when an edge of the subject (a portion of a subject where a brightness has a higher or lower threshold value than the circumference) is focused in a portion of the solid-state imaging element 5 enclosed by a broken line, a ratio of output signals of the phase difference detecting pixel cell 51L and the imaging pixel cell 51 which is adjacent to (for example, at a upper left side of) the phase difference detecting pixel cell or a ratio of output signals of the phase difference detecting pixel cell 51R and the imaging pixel cell 51 which is adjacent to (for example, at a lower right side of) the phase difference detecting pixel cell 51R does not have an exact value.

Therefore, when data of the sensitivity ratio illustrated in FIG. 3 is generated, the defocus amount calculating unit 19 excludes the pixel cell whose output signal reaches at a saturated level from an object for calculating a sensitivity ratio. Further, the defocus amount calculating unit 19 uses the captured image signal to detect an edge of the subject from the captured image signal and when there is an edge, the pixel cell on which the edge is focused is excluded from the object for calculating a sensitivity ratio. The defocus amount calculating unit 19 serves as an edge detecting unit which detects the edge.

The edge may be detected by comparing adjacent output signals having same color among the captured image signals. For example, since a difference between output signals of two imaging pixel cells 51 enclosed by a thick line in FIG. 10 is increased, it may be detected that edges overlap in any of the two imaging pixel cells 51. By comparing output signals of two adjacent pixel cells having the same color in the row direction X, the column direction Y, a 45° direction which is oblique from a lower left to an upper right in FIG. 10, and a 45° direction which is oblique from an upper left to a lower right in FIG. 10, an output signal in the captured image signal which corresponds to the edge may be detected.

As described above, a pixel cell whose output signal reaches at a saturated level and a pixel cell to which an edge is caught are removed from the object of calculating the sensitivity ratio, so that reliability of the correction data may be improved.

Further, in step S5 of FIG. 5, step S48 of FIG. 7, and step S48 of FIG. 9, as a sensitivity ratio which is used to generate the correction data, an average of sensitivity ratios calculated from a plurality of captured image signals which is continuously obtained may be used.

As described above, the data of the sensitivity ratio is calculated as an average of a plurality of captured data so that a brightness shading shape is more precisely detected, thereby improving the reliability of the correction data.

Until now, the pixel cells 51 is exemplified to be arranged in a so-called honey comb arrangement, but the present disclosure is applicable to a solid-state imaging element in which the pixel cells 51 are arranged in a square pattern.

Figure 11:
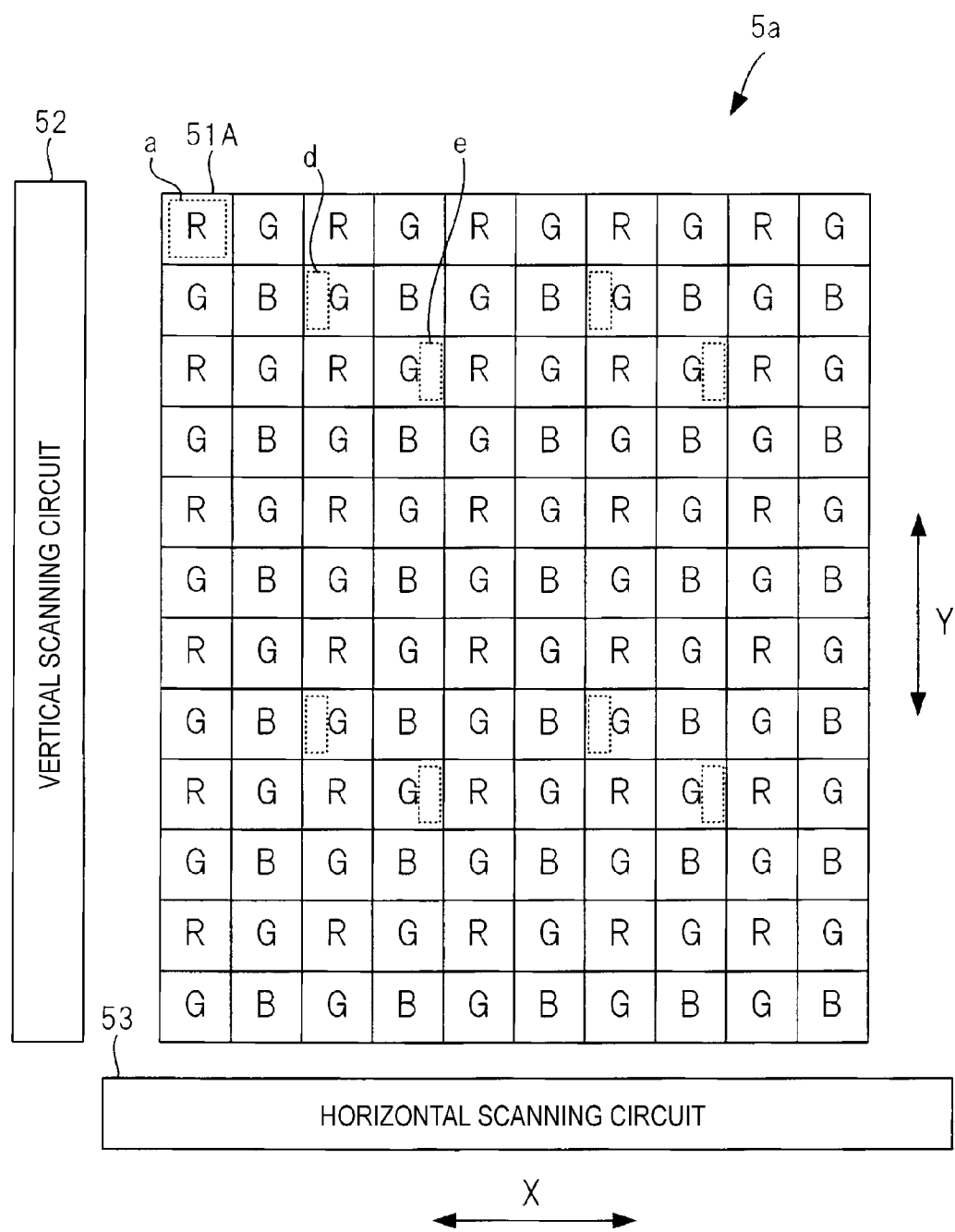
FIG. 11 is a view illustrating a solid-state imaging element 5a which is a modified embodiment of the solid-state imaging element 5 illustrated in FIG. 2.

FIG. 11 is a view illustrating a solid-state imaging element 5a which is a modified embodiment of the solid-state imaging element 5 illustrated in FIG. 2.

A solid-state imaging element 5a includes a plurality of pixel cells 51A which is arranged in a square lattice pattern in a row direction X and a column direction Y, a vertical scanning circuit 52, and a horizontal scanning circuit 53. A configuration of the pixel cells 51A is the same as that of the pixel cells 51 and an arrangement of color filters is a Bayer arrangement.

The plurality of pixel cells 51A includes a general pixel cell 51A in which an aperture "a" of a light shielding layer is not off-centered and phase difference detecting pixel cells having off-centered apertures "d" and "e". The pixel cell 51A having an aperture "d" corresponds to the phase difference detecting pixel cell 51L and the pixel cell 51A having an aperture "e" corresponds to the phase difference detecting pixel cell 51R.

Also in the solid-state imaging element 5a with this configuration, the correction data is generated by the above-described method, so that precise defocus amount may be calculated.

Figure 12:
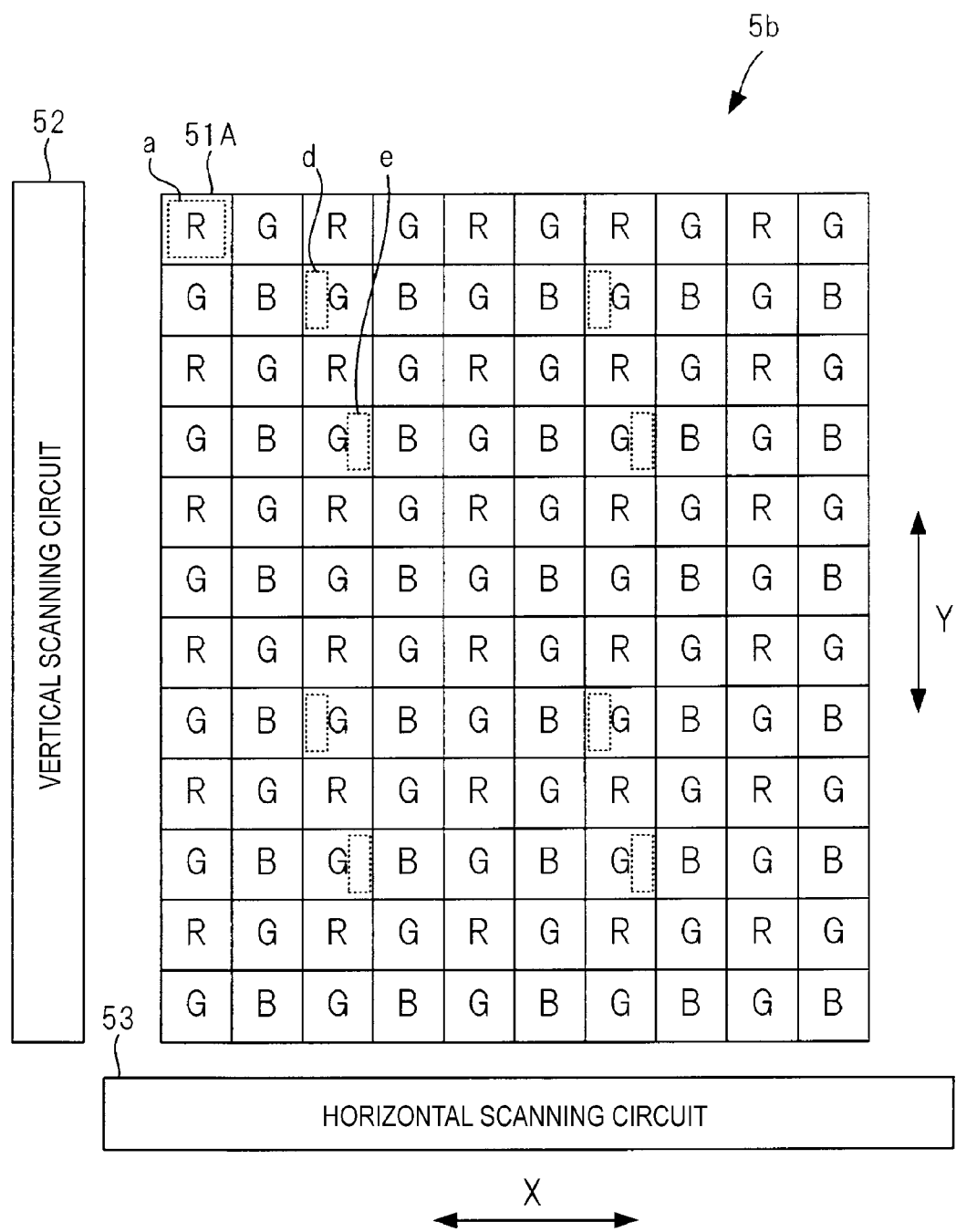
FIG. 12 is a view illustrating a solid-state imaging element 5b which is a modified embodiment of the solid-state imaging element 5 illustrated in FIG. 2.

In FIGS. 2 and 11, even though positions of the row direction X of the adjacent phase difference detecting pixel cell 51R and phase difference detecting pixel cell 51L are shifted by one pixel amount, the positions of the row direction X of the adjacent phase difference detecting pixel cell 51R and phase difference detecting pixel cell 51L may be the same as in the solid-state imaging element 5b illustrated in FIG. 12.

In this specification, the digital camera is exemplified as the imaging device, but the present disclosure may be applied to any of imaging device in which the lens device is mounted. For example, when the lens device is mounted in a smart phone with a camera, the technology of the embodiment may be applied.

Further, in this specification, even though an imaging device in which the lens device is replaceable is exemplified, a lens-integrated imaging device in which the lens device is fixed to the camera main body may generate the correction data using the above-described method to improve the precision of the phase difference AF.

Even when the lens data is fixed, data of the sensitivity ratio illustrated in FIG. 3 may be changed in accordance with the circumstance at the time of imaging.

For example, when resin is used as a lens which is included in an imaging optical system, when the imaging is performed at a high temperature, the lens is deformed so that an incident light angle to the solid-state imaging element may be shifted from an angle as designed. Even in this case, as described above, the correction data is generated using the captured image signal obtained by capturing an image by the solid-state imaging element, so that correction data in accordance with the imaging environment is obtained, thereby improving precision of the phase difference AF.

In the digital camera of FIG. 1, the phase difference detecting pixel cells 51R and 51L are provided enough to capture an image having a sufficient resolution as single body and a stereoscopic imaging function to generate a stereoscopic image from an image captured by the phase difference detecting pixel cell 51R and an image captured by the phase difference detecting pixel cell 51L may be provided.

Also in this case, the correction data is generated by the above-described method and the output signal of the phase difference detecting pixel cell 51R and the output signal of the phase difference detecting pixel cell 51L are corrected by the correction data and then the stereoscopic image is generated. By doing this, a stereoscopic image is generated by two images having shading characteristics, so that a quality of the stereoscopic image may be improved.

Until now, even though color filters having a plurality of colors are mounted in the solid-state imaging elements 5, 5a, and 5b to perform color imaging, the solid-state imaging elements 5, 5a, and 5b may be an imaging element for monochromic imaging in which a green filter as a single color is mounted as the color filter or the color filter is omitted.

Further, the data of the sensitivity ratio illustrated in FIG. 3 uses an average of sensitivity ratios of a plurality of phase difference detecting pixel cells whose positions in the column direction Y, but data of the sensitivity ratio for every row of the pixel cell including the phase difference detecting pixel cells 51R and 51L is generated and the correction is generated for the row to correct the sensitivity ratio.

As described above, the specification discloses the following matters.

It is disclosed an imaging device to which an imaging optical system is attachable, including: an imaging element including a plurality of imaging pixel cells that captures an image formed by a luminous flux passing through a pupil area of the imaging optical system, a plurality of first phase difference detecting pixel cells that captures one of a pair of images formed by a pair of luminous fluxes which have passed through different parts of the pupil area of the imaging optical system, and a plurality of second phase difference detecting pixel cells that captures the other one of the pair of images; a correction data generating unit that generates correction data to correct a sensitivity difference of the first phase difference detecting pixel cells and the second phase difference detecting pixel cells using an output signal of the imaging pixel cells, an output signal of the first phase difference detecting pixel cells, and an output signal of the second phase difference detecting pixel cells which are included in a captured image signal obtained by imaging a subject by the imaging element; and a signal correcting unit that corrects at least one of the output signal of the first phase difference detecting pixel cells and the output signal of the second phase difference detecting pixel cells in accordance with the correction data, in which the correction data generating unit calculates a ratio of the output signal of the first phase difference detecting pixel cell and an output signal of the imaging pixel cell which is adjacent to the first phase difference detecting pixel cell and a ratio of an output signal of the second phase difference detecting pixel cell which is adjacent to the first phase difference detecting pixel cell and an output signal of the imaging pixel cell which is adjacent to the second phase difference detecting pixel cell to generate the correction data based on the two ratios.

The disclosed imaging device may have a configuration in which the correction data generating unit calculates a coefficient which is multiplied to at least one of output signals of the first phase difference detecting pixel cell and the second phase difference detecting pixel cell required to make the two ratios be equal to each other, as the correction data.

The disclosed imaging device may have a configuration in which the correction data generating unit uses an average of output signals obtained by imaging a subject a plurality of times by the imaging element, as the output signal of the imaging pixel cell which is used to generate correction data, the output signal of the first phase difference detecting pixel cell, and the output signal of the second phase difference detecting pixel cell.

The disclosed imaging device may have a configuration in which the correction data generating unit includes a frame rate control unit which generates the correction data while imaging a moving image when continuous imaging is performed by the imaging element, and the frame rate control unit controls to increase a first frame rate when imaging is performed a plurality of times to be higher than a second frame rate while imaging a moving image in accordance with an exposure time of each frame set in imaging the moving image.

The disclosed imaging device may have a configuration in which when the exposure time is shorter than a threshold value, the frame rate control unit controls to increase the first frame rate to be higher than the second frame rate and when the exposure time is equal to or longer than the threshold value, controls the first frame rate to be equal to the second frame rate.

The disclosed imaging device may have a configuration in which the correction data generating unit determines the number of output signals to calculate an average based on an ISO sensitivity set in imaging when the output signal is obtained.

The disclosed imaging device may have a configuration in which the correction data generating unit calculates the average excluding a captured image signal including an output signal whose difference from other output signal exceeds a threshold value, among the output signals of the same pixel cell obtained by imaging the subject a plurality of times by the imaging element.

The disclosed imaging device may have a configuration in which the correction data generating unit uses an average of ratios obtained from output signals obtained by imaging a subject a plurality of times by the imaging element, as the ratio which is used to generate the correction data.

The disclosed imaging device may further include: an edge detecting unit that detects an edge of the subject in the captured image signal based on the captured image signal, in which the correction data generating unit excludes an output signal of a pixel cell to which the edge is caught, as the output signal which is used to generate the correction data.

The disclosed imaging device may have a configuration in which the correction data generating unit excludes an output signal which reaches at a saturated level, as an output signal which is used to generate the correction data.

The disclosed imaging device may have a configuration in which the correction data generating unit generates the correction data when an optical condition of the imaging optical system or the imaging optical system is changed.

The disclosed imaging device may further include: a recording control unit that records in a recording medium the correction data generated by the correction data generating unit to be associated with identification information of the imaging optical system mounted when the correction data is calculated, in which when an imaging optical system where the correction data is recorded in the recording medium is mounted, the signal correcting unit corrects at least one of the output signals of the first phase difference detecting pixel cell and the output signal of the second phase difference detecting pixel cell, in accordance with the correction data recorded in the recording medium.

The disclosed imaging device may further include: a recording control unit that records the correction data generated by the correction data generating unit to be associated with identification information of the imaging device in a recoding medium provided in the imaging optical system mounted when the correction data is calculated, in which when an imaging optical system where the correction data corresponding to the identification information of the imaging device is recorded in the recording medium is mounted, the signal correcting unit corrects at least one of the output signals of the first phase difference detecting pixel cell and the output signal of the second phase difference detecting pixel cell, in accordance with the correction data recorded in the recording medium.

The disclosed imaging device may further include: a phase difference calculating unit that calculates a phase difference amount which is a relative positional off-centered amount of the pair of images using the output signal which is corrected by the signal correcting unit; and a focus control unit that controls a focus state of the imaging optical system based on the phase difference amount, It is disclosed a signal processing method in an imaging device to which an imaging optical system is attachable, the method including: a correction data generating step of imaging a subject by an imaging element which includes a plurality of imaging pixel cells which captures an image formed by a luminous flux passing through a pupil area of the imaging optical system, a plurality of first phase difference detecting pixel cells which captures one of a pair of images formed by a pair of luminous fluxes which have passed through different parts of the pupil area of the imaging optical system, and a plurality of second phase difference detecting pixel cells which captures the other one of the pair of images and generating which generates correction data to correct a sensitivity difference of the first phase difference detecting pixel cells and the second phase difference detecting pixel cells using an output signal of the imaging pixel cells, an output signal of the first phase difference detecting pixel cells, and an output signal of the second phase difference detecting pixel cells which are included in a captured image signal obtained by the imaging; and a signal correcting step of correcting at least one of the output signal of the first phase difference detecting pixel cells and the output signal of the second phase difference detecting pixel cells in accordance with the correction data, in which in the correction data generating step, a ratio of the output signal of the first phase difference detecting pixel cell and an output signal of the imaging pixel cell which is adjacent to the first phase difference detecting pixel cell and a ratio of an output signal of the second phase difference detecting pixel cell which is adjacent to the first phase difference detecting pixel cell and an output signal of the imaging pixel cell which is adjacent to the second phase difference detecting pixel cell are calculated to generate the correction data based on the two ratios.

With the disclosed matters discussed above, it is possible to precisely correct a shading of a pair of images having a phase difference.

Although the present disclosure has been described above by the specific embodiments, the present disclosure is not limited to the embodiments but various modifications may be allowed without departing from a technical spirit of the disclosed invention.

What is claimed is:

1. An imaging device to which an imaging optical system is attachable, comprising:
   an imaging element including a plurality of imaging pixel cells that captures an image formed by a luminous flux passing through a pupil area of the imaging optical system, a plurality of first phase difference detecting pixel cells that captures one of a pair of images formed by a pair of luminous fluxes which have passed through different parts of the pupil area of the imaging optical system, and a plurality of second phase difference detecting pixel cells that captures the other one of the pair of images;
   a processor configured to:
   generate correction data to correct a sensitivity difference of the first phase difference detecting pixel cells and the second phase difference detecting pixel cells using an output signal of the imaging pixel cells, an output signal of the first phase difference detecting pixel cells, and an output signal of the second phase difference detecting pixel cells which are included in a captured image signal obtained by imaging a subject by the imaging element; and correct at least one of the output signal of the first phase difference detecting pixel cells and the output signal of the second phase difference detecting pixel cells in accordance with the correction data, wherein the processor is further configured to calculate a ratio of the output signal of the first phase difference detecting pixel cell and an output signal of the imaging pixel cell which is adjacent to the first phase difference detecting pixel cell and a ratio of an output signal of the second phase difference detecting pixel cell which is adjacent to the first phase difference detecting pixel cell and an output signal of the imaging pixel cell which is adjacent to the second phase difference detecting pixel cell to generate the correction data based on the two ratios, wherein the processor is further configured to use an average of output signals obtained by imaging a subject a plurality of times by the imaging element, as the output signal of the imaging pixel cell which is used to generate correction data, the output signal of the first phase difference detecting pixel cell, and the output signal of the second phase difference detecting pixel cell, and wherein the processor is further configured to determine the number of output signals to calculate an average based on an ISO sensitivity set in imaging when the output signal is obtained.

2. The imaging device of claim 1, wherein the processor is further configured to calculate a coefficient which is multiplied to at least one of output signals of the first phase difference detecting pixel cell and the second phase difference detecting pixel cell required to make the two ratios be equal to each other, as the correction data.

3. The imaging device of claim 1, wherein the processor is further configured to generate the correction data while imaging a moving image when continuous imaging is performed by the imaging element, and the processor is further configured to increase a first frame rate when imaging is performed a plurality of times to be higher than a second frame rate while imaging a moving image in accordance with an exposure time of each frame set in imaging the moving image.

4. The imaging device of claim 3, wherein when the exposure time is shorter than a threshold value, the processor is further configured to control to increase the first frame rate to be higher than the second frame rate and when the exposure time is equal to or longer than the threshold value, controls the first frame rate to be equal to the second frame rate.

5. The imaging device of claim 1, wherein the processor is further configured to calculate the average excluding a captured image signal including an output signal whose difference from other output signal exceeds a threshold value, among the output signals of the same pixel cell obtained by imaging the subject a plurality of times by the imaging element.

6. The imaging device of claim 1, wherein the processor is further configured to use an average of ratios obtained from output signals obtained by imaging a subject a plurality of times by the imaging element, as the ratio which is used to generate the correction data.

7. The imaging device of claim 1, the processor is further configured to:

detect an edge of the subject in the captured image signal based on the captured image signal, wherein the processor is further configured to exclude an output signal of a pixel cell to which the edge is caught, as the output signal which is used to generate the correction data.

8. The imaging device of claim 1, wherein the processor is further configured to exclude an output signal which reaches at a saturated level, as an output signal which is used to generate the correction data.

9. The imaging device of claim 1, wherein the processor is further configured to generate the correction data when an optical condition of the imaging optical system or the imaging optical system is changed.

10. The imaging device of claim 1, wherein the processor is further configured to:

record in a recording medium the generated correction data to be associated with identification information of the imaging optical system mounted when the correction data is calculated, wherein when an imaging optical system where the correction data is recorded in the recording medium is mounted, the processor is further configured to correct at least one of the output signals of the first phase difference detecting pixel cell and the output signal of the second phase difference detecting pixel cell, in accordance with the correction data recorded in the recording medium.

11. The imaging device of claim 1, wherein the processor is further configured to:

record the generated correction data to be associated with identification information of the imaging device in a recoding medium provided in the imaging optical system mounted when the correction data is calculated, wherein when an imaging optical system where the correction data corresponding to the identification information of the imaging device is recorded in the recording medium is mounted, the processor is further configured to correct at least one of the output signals of the first phase difference detecting pixel cell and the output signal of the second phase difference detecting pixel cell, in accordance with the correction data recorded in the recording medium.

12. The imaging device of claim 1, wherein processor is further configured to:

calculate a phase difference amount which is a relative positional off-centered amount of the pair of images using the corrected output signal; and control a focus state of the imaging optical system based on the phase difference amount.

13. A signal processing method in an imaging device to which an imaging optical system is attachable, the method comprising:

a correction data generating step of imaging a subject by an imaging element which includes a plurality of imaging pixel cells which captures an image formed by a luminous flux passing through a pupil area of the imaging optical system, a plurality of first phase difference detecting pixel cells which captures one of a pair of images formed by a pair of luminous fluxes which have passed through different parts of the pupil area of the imaging optical system, and a plurality of second phase difference detecting pixel cells which captures the other one of the pair of images and generating which generates correction data to correct a sensitivity difference of the first phase difference detecting pixel cells and the second phase difference detecting pixel cells using an output signal of the imaging pixel cells, an output signal of the first phase difference detecting pixel cells, and an output signal of the second phase difference detecting pixel cells which are included in a captured image signal obtained by the imaging; and a signal correcting step of correcting at least one of the output signal of the first phase difference detecting pixel cells and the output signal of the second phase difference detecting pixel cells in accordance with the correction data, wherein in the correction data generating step, a ratio of the output signal of the first phase difference detecting pixel cell and an output signal of the imaging pixel cell which is adjacent to the first phase difference detecting pixel cell and a ratio of an output signal of the second phase difference detecting pixel cell which is adjacent to the first phase difference detecting pixel cell and an output signal of the imaging pixel cell which is adjacent to the second phase difference detecting pixel cell are calculated to generate the correction data based on the two ratios, wherein the correction data generating step uses an average of output signals obtained by imaging a subject a plurality of times by the imaging element, as the output signal of the imaging pixel cell which is used to generate correction data, the output signal of the first phase difference detecting pixel cell, and the output signal of the second phase difference detecting pixel cell, and wherein the correction data generating step determines the number of output signals to calculate an average based on an ISO sensitivity set in imaging when the output signal is obtained.

\* \* \* \* \*